United States Patent
Coyne et al.

[11] Patent Number: 5,943,619
[45] Date of Patent: Aug. 24, 1999

[54] SHARED INTERWORKING OF SUBSCRIBER FEATURES WITHIN MOBILE TELECOMMUNICATIONS NETWORKS

[75] Inventors: Michael Coyne, Stockholm, Sweden; Eric Valentine, Plano, Tex.

[73] Assignee: Ericsson Inc., Research Triangle Park, N.C.

[21] Appl. No.: 08/845,917

[22] Filed: Apr. 29, 1997

[51] Int. Cl.[6] .................................................. H04Q 7/22
[52] U.S. Cl. .................................... 455/433; 455/432
[58] Field of Search .................................. 455/433, 432, 455/436, 422, 552, 553, 517, 414, 461, 435

[56] References Cited

U.S. PATENT DOCUMENTS

| | | | |
|---|---|---|---|
| 5,396,543 | 3/1995 | Beeson, Jr. et al. | 455/560 |
| 5,610,974 | 3/1997 | Lantto . | |
| 5,794,142 | 8/1998 | Vanttila et al. | 455/466 |

FOREIGN PATENT DOCUMENTS

| | | |
|---|---|---|
| 0 750 436 | 12/1995 | European Pat. Off. . |
| 2 304 497 | 3/1997 | United Kingdom . |
| WO 95/01069 | 1/1995 | WIPO . |
| WO 95/27382 | 10/1995 | WIPO . |
| WO 96/38989 | 12/1996 | WIPO . |

OTHER PUBLICATIONS

PCT International Search Report, Oct. 26, 1998, PCT/US 98/08553.

*Primary Examiner*—Reinhard J. Eisenzopf
*Assistant Examiner*—Edan Orgad
*Attorney, Agent, or Firm*—Jenkens & Gilchrist, P.C.

[57] ABSTRACT

A protocol enhancer (PE) is interfaced between a home location register (HLR) associated with a home mobile telecommunications network and a serving mobile switching center/visitor location register (MSC/VLR) associated within a visited mobile telecommunications network. Whenever a mobile station associated with the home network roams into the visited network, the PE down-loads subscriber data associated with the mobile station from the HLR. The down-loaded subscriber data are then combined with additional subscriber data unique to the visited network. Such data, for example, enable the roaming mobile station to utilize additional subscriber features not provided by the first network. The combined subscriber data are then communicated to the serving MSC/VLR. The serving MSC/VLR then utilizes the combined subscriber data to provide otherwise unavailable subscriber features to the roaming mobile station.

19 Claims, 5 Drawing Sheets

SHARED INTERWORKING OF SUBSCRIBER FEATURES WITHIN MOBILE TELECOMMUNICATIONS NETWORKS

BACKGROUND OF THE INVENTION

1. Technical Field of the Invention

The present invention relates to mobile telecommunications networks and, in particular, to the interworking of subscriber features and associated data for a roaming mobile station within multiple mobile telecommunications networks.

2. Description of Related Art

Within a typical mobile telecommunications network, each mobile subscriber has a subscription agreement with a mobile service provider. A centralized database, known as a home location register (HLR), stores subscription data associated with each subscriber. As a mobile station associated with a particular subscriber moves within a serving mobile telecommunications network, a telecommunications node, such as a mobile switching center/visitor location register (MSC/VLR), providing radio coverage over an associated geographic area communicates with the associated HLR. Such communication facilitates the downloading of the necessary subscriber data (also known as subscription data) to the serving MSC/VLR for the provision of mobile service to the traveling mobile station. As a result, regardless of which MSC/VLR is currently serving the traveling mobile station, the mobile station is able to access and utilize its associated subscriber data. Such subscriber data, for example, enable the mobile subscriber to utilize its subscriber features (e.g., call forwarding, call barring) and billing accounts (preferred inter-LATA carrier—long distance carrier).

Each mobile telecommunications network provides multiple subscriber features and services. Accordingly, a mobile subscriber having a subscription with a mobile telecommunications network needs to subscribe to available subscriber features and to provide requisite subscriber feature data thereto. As an illustration, for a call forwarding on busy (CFB) subscriber feature, the subscriber needs to provide a desired forward-to-number to the serving network. Utilizing such subscriber feature data, the serving mobile telecommunications network is then able to provide uniform subscriber features and services to the traveling mobile subscriber.

However, because mobile service providers operate independently of each other, a first mobile service provider may provide a different group of service features than a second mobile service provider. Since a mobile subscriber associated with the second mobile service provider has subscribed to and defined subscription data only with the second service provider, when the mobile subscriber roams into a mobile telecommunications network being served by the first mobile service provider, the mobile subscriber is not able to utilize the additional subscriber features and services provided by the first mobile service provider.

As an illustration, the first mobile service provider provides a high penetration notification (HPN) subscriber feature to its associated mobile subscribers. A mobile subscriber having a subscription agreement with the second mobile service provider, which does not provide the HPN subscriber feature, roams into the first mobile service provider's network. Since an HLR associated with the second mobile service provider and storing subscription data associated with the roaming mobile subscriber retains no subscription data representing the HPN subscriber feature, a serving MSC/VLR within the first mobile service provider's network is unable to provide the HPN functionality to the roaming mobile subscriber. Not being able to utilize additional subscriber features and services being offered by a visited mobile telecommunications network, as illustrated above, is inefficient and undesirable.

Accordingly, there is a need for a mechanism to enable a roaming mobile subscriber to access and to utilize subscriber features being provided by a visited mobile telecommunications network even when such features are not supported by the home mobile telecommunications network.

SUMMARY OF THE INVENTION

A mobile station is associated with a first mobile telecommunications network and currently traveling within a second mobile telecommunications network. A home location register (HLR) located within the first mobile telecommunications network stores subscriber data associated with said mobile station. A telecommunications service node located within the second mobile telecommunications network receives an indication from the roaming mobile station to register with a particular mobile switching center/visitor location register (MSC/VLR) within the second mobile telecommunications network. The telecommunications service node then communicates with the HLR associated with the mobile station to retrieve the subscriber data associated therewith. The telecommunications service node then retrieves additional subscriber data associated with the second mobile telecommunications network and not provided by the HLR. The telecommunications service node thereafter communicates the combined data to the registering MSC/VLR. Utilizing the provided combined subscriber data, the MSC/VLR provides subscriber features available within the second mobile telecommunications network to the roaming mobile station.

The telecommunications service node further comprises a register for storing data correlating the HLR associated with said mobile station with the MSC/VLR currently serving the roaming mobile station. Such mapping data enable the HLR and the serving MSC/VLR to communicate signals therebetween.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
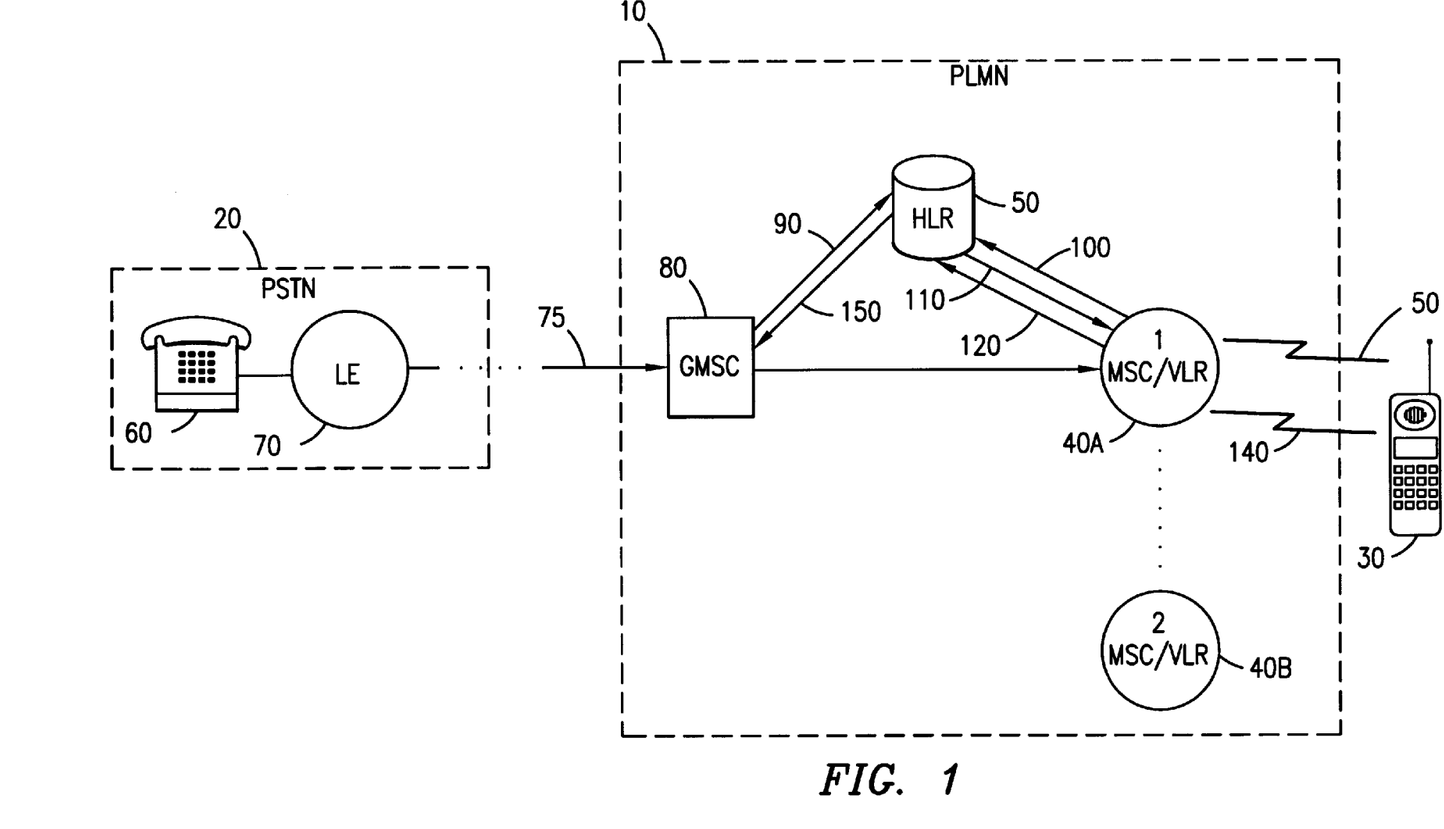
FIG. 1 is a block diagram of a Public Land Mobile Network (PLMN) interconnected with a Public Switched Telephone Network (PSTN) to provide mobile service to a mobile station.

FIG. 1 is a block diagram of a telecommunications network illustrating the network interconnection of a Public Land Mobile Network (PLMN) 10 to a Public Switched Telephone Network (PSTN) 20. A mobile station 30 (also known as a mobile terminal or equipment) is associated with a particular PLMN as the home PLMN 10. Within each PLMN, e.g., home PLMN 10, there are a number of different mobile switching centers (MSCs), only two of which are shown in FIG. 1 for exemplary purposes, servicing the geographic area covered by the PLMN. Each MSC is further associated with a visitor location register (VLR) for storing necessary subscriber information related to the mobile subscriber traveling within its MSC coverage area (hereinafter referred to as MSC/VLR 40). Each mobile station (only one shown in FIG. 1) 30 within the home PLMN 10 is further assigned to a particular home location register (HLR) 50. The HLR 50 is a centralized database storing subscriber information related to the mobile station 30. For example, the HLR 50 stores and maintains subscriber application data, preferred long distance carrier data, and, more particularly, the identity of the MSC/VLR currently providing mobile service to the mobile station 30. Such an identity is later utilized by the PLMN 10 to determine the appropriate MSC/VLR currently serving the mobile station and to properly reroute incoming calls to the called party mobile station 30.

In order to constantly update the HLR 50 with the current location of the mobile station 30, whenever the mobile station 30 turns on its unit for the first time or travels into a new MSC coverage area, the associated MSC/VLR, e.g., MSC 40a, performs a location update with the associated HLR 50. The serving MSC/VLR 40a receives a mobile station identification number, such as an International Mobile Subscriber Identity (IMSI) number, from the mobile station 30 as the mobile station 30 registers with the serving MSC/VLR 40a. Since an IMSI number can be used to route a message to an associated HLR, by utilizing the received IMSI number as the destination address, the serving MSC/VLR 40a is able to inform the appropriate HLR 50 of the current location of the mobile station 30. Such a location update signal 100 further requests the HLR 50 to provide subscriber information associated with the registering mobile station 30 to the updating MSC/VLR 40a. Such information further comprises subscriber feature data needed by the serving MSC/VLR 40a for providing mobile service to the registering mobile station 30. For example, such subscriber feature data include a forward-to-number for a call forwarding feature activated by the mobile subscriber.

Thereafter, whenever an incoming call is received towards the mobile station 30, the previously updated location data within the HLR 50 are utilized by the serving PLMN 10 to properly reroute the call connection to the mobile station 30. As an illustration, a wireline terminal 60 connected to a local exchange (LE) 70 originates a call setup signal, such as an Integrated Service Digital Network User Part (ISUP) based Initial Address Message (IAM), towards the mobile station 30 using a Mobile Subscriber Integrated Service Digital Network (MSISDN) number assigned to the mobile station 30 as the called party number. The directory number associated with the wireline terminal 60 is further included in the transmitted IAM signal as the calling party number. Utilizing the indicated MSISDN number as the destination address, the serving telecommunications networks route the received ISUP signal to a Gateway Mobile Switching Center (GMSC) 80 associated with the home PLMN 10. As a result, a circuit or trunk call connection 75 is established between the local exchange 70 and the GMSC 80. Not knowing where the called party mobile station 30 is currently located, the GMSC 80 transmits a Mobile Application Part (MAP) based signal to the HLR 50 associated with the called party mobile station 30 for a routing instruction (signal 90). The HLR 50, in turn, retrieves the previously stored location information associated with the specified MSISDN number, identifies the MSC/VLR 40a currently serving the associated mobile station 30, and transmits another MAP based signal 110 requesting a roaming number to the identified MSC/VLR 40a. The serving MSC/VLR 40a then returns the roaming number representing the serving MSC/VLR 40a to the HLR 50 via another MAP based signal 120. The received roaming number is, in turn, transmitted back to the requesting GMSC 80 via yet another MAP based signal 150. Utilizing the received roaming number as the new called party address, the GMSC 80 reroutes the received incoming call connection to the serving MSC/VLR 40a. Accordingly, a call connection 130 between the GMSC 80 and the serving MSC/VLR 40a is established. The serving MSC/VLR 40a then pages the mobile station 30 traveling within its coverage area, assigns a pair of radio channels 140, and enables the wireline terminal 60 to communicate with the called party mobile station 30.

Figure 2:
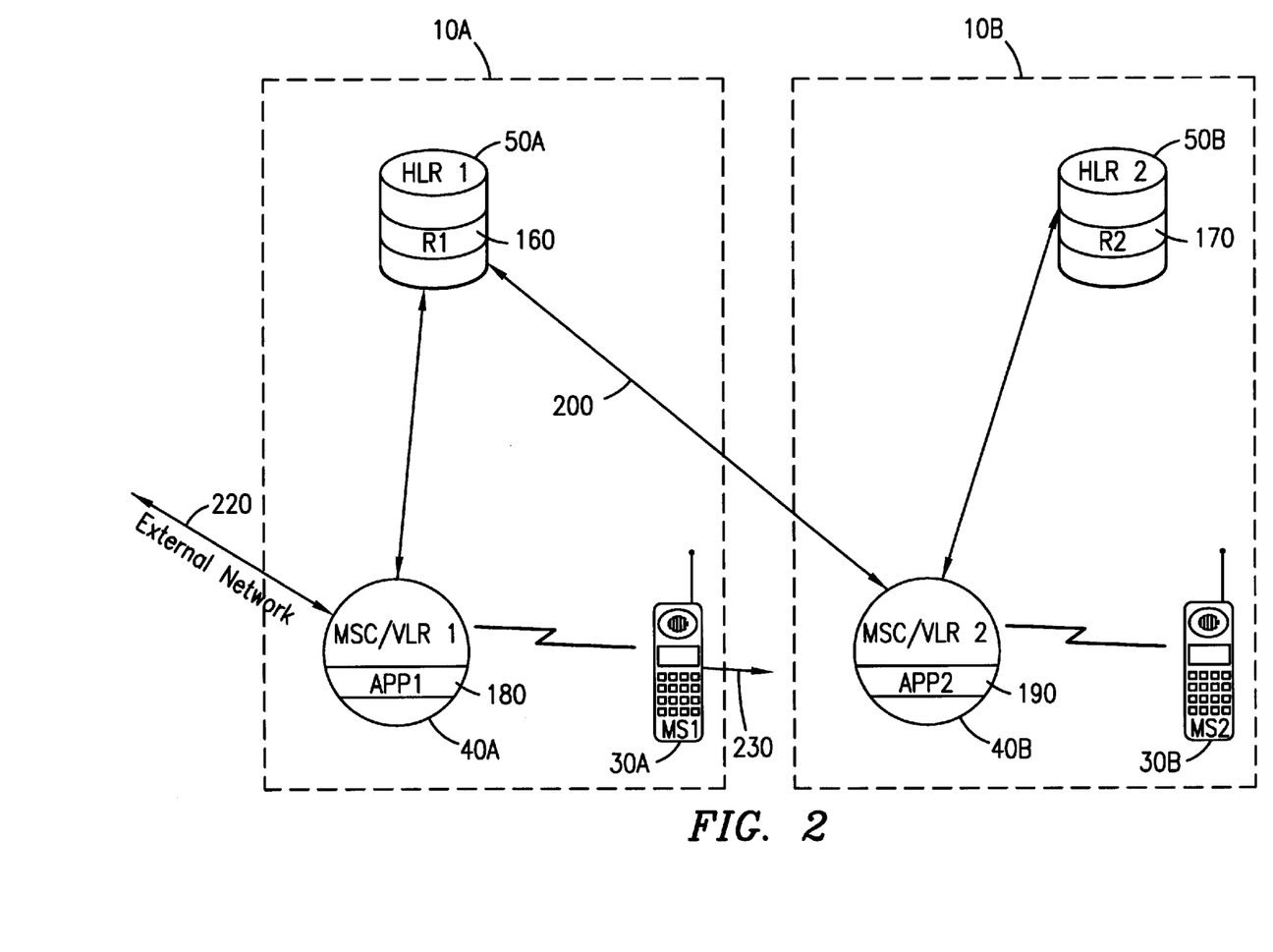
FIG. 2 is a block diagram of multiple PLMNs illustrating a mobile station associated with a first PLMN roaming into a second PLMN.

FIG. 2 is a block diagram of multiple PLMNs illustrating a mobile station associated with a first PLMN roaming into a second PLMN. As illustrated above, a mobile station typically has a subscription agreement with only one mobile service provider. The mobile service provider, in turn, assigns an IMSI number from a series of IMSI numbers typically pre-allocated to a particular HLR within the associated mobile telecommunications network. For example, a first mobile station 30A is associated with a first PLMN 10A as its home network. Similarly, a second mobile station 30B is associated with a second PLMN 10B as its home network. While establishing a subscription agreement with the provider, the first mobile subscriber (associated with the first mobile station 30A) provides necessary subscriber data to the associated HLR (HLR1 50A) . Such data include, for example, subscriber feature data, billing data, the name of the account holder, etc. The provided subscriber feature data further indicate to what features or services the subscriber has subscribed. The provided subscriber data may further include subscriber defined information, such as a forward-to-directory number, voicemail options, preferred long distance carrier option, etc.

Accordingly, the subscriber data associated with the first mobile subscriber are stored at a first register (R1) 160 within the first home location register (HLR1) 50A located within the first PLMN 10A. Such data are then down-loaded by a first MSC/VLR 40A and utilized by a first application module 180 associated therewith for providing a particular subscriber feature toward the first mobile station 30A. As an illustration, when the subscriber data retrieved from the first HLR1 50A indicate that the first mobile station 30A has a call forwarding on busy (CFB) subscriber feature activated, an incoming call connection 220 from an external telecommunications network, such as a Public Switched Telephone Network (PSTN), towards a busy first mobile station 30A will be redirected by the serving MSC/VLR1 40A to the provided forward-to-number.

A second register (R2) 170 associated with a second HLR 50B similarly stores subscriber data associated with the second mobile station 30B. A second MSC/VLR 40B providing radio coverage for the second mobile station 30B, for example, then performs a location update to inform the second HLR 50B of the second mobile station's current location. The second MSC/VLR 40B similarly retrieves the requisite subscriber data associated with the second mobile station 30B from the second HLR 50B. Utilizing the retrieved subscriber data, an application module 40B associated with the second MSC/VLR 40B also provides mobile service towards the traveling second mobile station 30B.

Because each PLMN or service provider operates and provides subscriber features and services independent of other service providers, the first register and the second register may store subscriber data reflecting different subscriber features and services. The second PLMN may support subscriber features in addition to or different from the subscriber features being supported by the first PLMN. When the first mobile station 30A travels out of the first PLMN area and moves (line 230) into the second PLMN area, it would then be advantageous for the first mobile station 30A to have access to and perhaps utilize the additional subscriber features being provided by the second PLMN 10B. However, the subscriber data downloaded (signal 200) by the second MSC/VLR 40B, for example, from the associated HLR 50A do not contain any subscriber data pertaining to the additional subscriber features being provided within the second PLMN 10B. This is because the data retained within the first HLR 50A only reflect the subscriber features and services being provided within the first PLMN 10A. As a result, the second MSC/VLR 40B assumes that the roaming mobile subscriber has no subscription to the features and no access is granted therewith.

Figure 3:
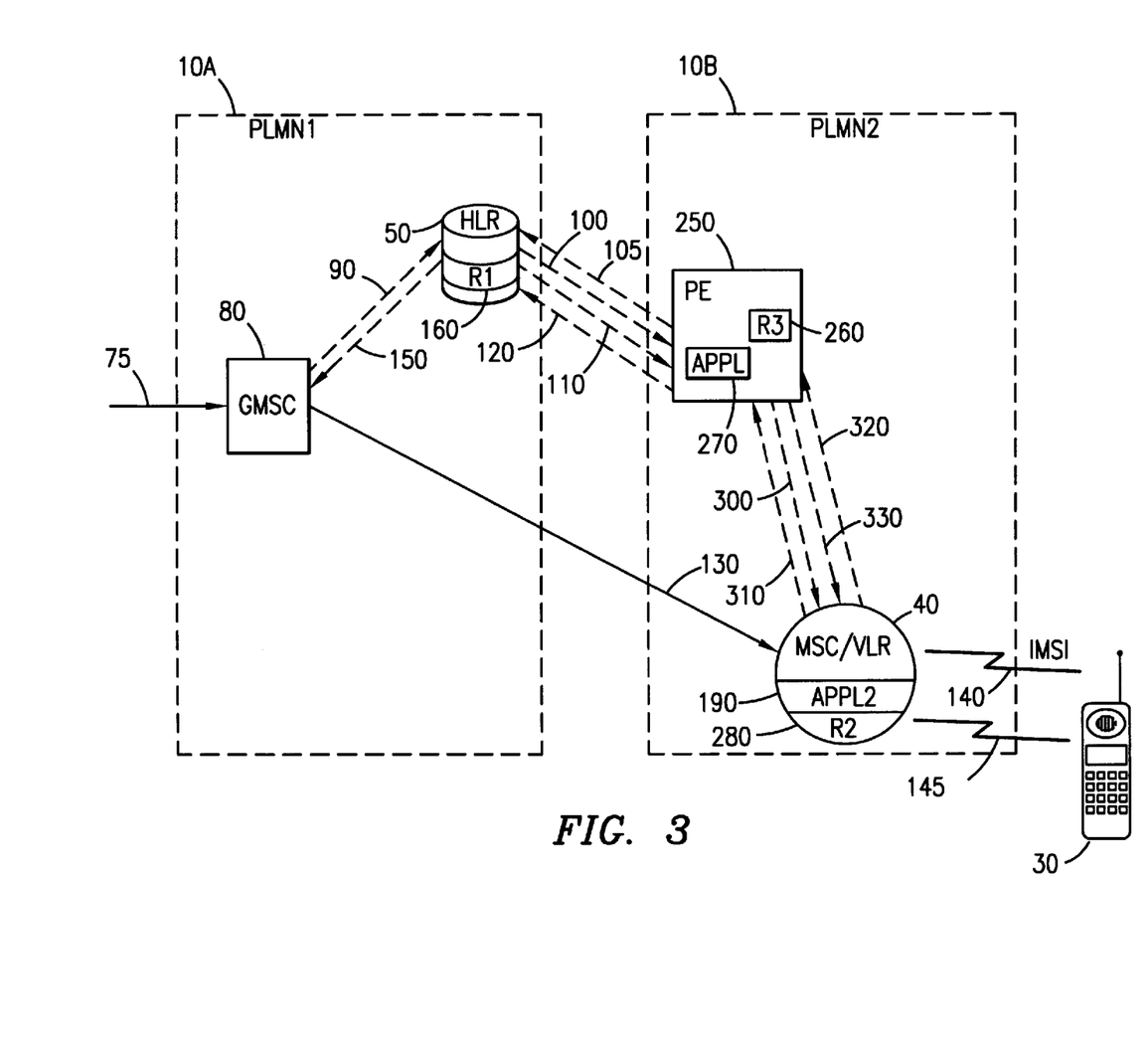
FIG. 3 is a block diagram of multiple PLMNs illustrating the provision of subscriber feature data interworking for the roaming mobile station in accordance with the teachings of the present invention.
Figure 4:
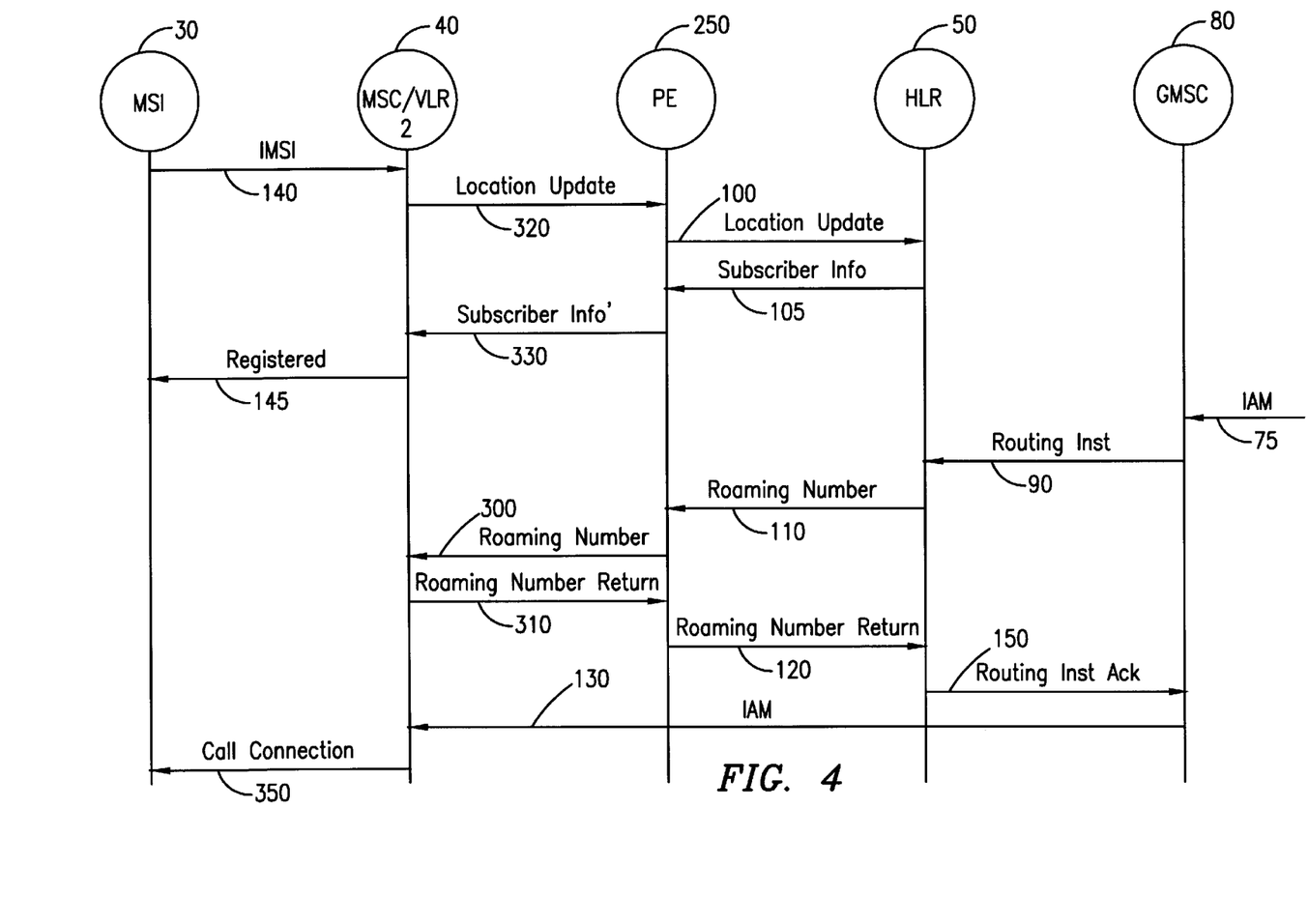
FIG. 4 is a signal sequence chart illustrating the provision of subscriber feature data interworking for the roaming mobile station within multiple PLMNs.

Reference is now made to both FIGS. 3 and 4 illustrating the provision of subscriber data interworking for the roaming mobile station in accordance with the teachings of the present invention. A new telecommunications service node known as a protocol enhancer (PE) 250 is introduced into the serving mobile telecommunications network. The PE 250 then functions as an interface module between a home location register (HLR) 50 located within a first PLMN 10A and an MSC/VLR 40 located within a second PLMN 10B.

A mobile station 30 having a subscription agreement with the first PLMN 10A roams into the second PLMN 20B and attempts to register with the MSC/VLR 40 providing radio coverage over a particular geographic area. As an illustration, a Global Standard for Mobile (GSM) communications system based mobile station transmits an associated IMSI number 140 to the serving MSC/VLR 40. Utilizing the received IMSI number, an application module 190 associated with the serving MSC/VLR 40 attempts to identify the assigned HLR 50 and to perform a location update thereto. Since an IMSI number identifies an HLR which stores the data associated with that IMSI number, by analyzing the received IMSI number, the serving MSC/VLR 40 and the connected PLMN 10B are able to route a signal from the MSC/VLR 40 to the proper HLR 50. However, instead of routing a signal requesting location update and subscriber data in a conventional manner as described in FIG. 1, the application module 190 instead routes the location update signal to the PE 210. For example, a register (R2) 280 attached to the serving MSC/VLR 40 stores data correlating a network address representing the newly introduced PE 210 with the received IMSI number.

The IMSI consists of three different parts:

IMSI=MCC+MNC+MSIN

Wherein:

MCC=Mobile County Code (3 digits)

MNC=Mobile Network Code (2 digits)

MSIN=Mobile Subscriber ID Number (max 10 digits).
For a particular MCC+MNC pointing to the first PLMN 10A, the register (R2) 280 instead converts the routing address to point to the newly introduced PE 250. The associated application module 190 then transmits a location update signal 320 to the designated PE 250 using the translated network address. The IMSI number representing the mobile station 30 is further encapsulated within the transmitted MAP based signal towards the PE 250. An application module 270 within the PE 250 then receives the location update signal 320 and identifies the HLR 50 indicated by the encapsulated IMSI number. The application module 270 then forwards the location update signal 100 to the identified HLR 50. Furthermore, while forwarding the location update signal 100, the PE 210 is identified as the originating telecommunications node.

The HLR 50 determines the subscription record associated with the indicated IMSI number and appropriately updates the location register to indicate the current location of the roaming mobile station. Accordingly, the network address representing the newly introduced PE 210 is stored within the HLR 50 as the mobile telecommunications node currently serving the roaming mobile station. The HLR 50 then down-loads the subscriber data associated with the mobile station thereto. Accordingly, another MAP based signal, such as an Insert Subscriber Data signal 105 is originated by the HLR 50 with the necessary subscriber data. As a result, the MAP signal 105 with the associated subscriber data is routed to the PE 250. The application module 270 within the PE 250 then determines which features or services available within the second PLMN 10B are not defined by the subscriber data received from the HLR 50. The application module 270 then retrieves the not-provided-data from an associated register (R3) 260. As an illustration, if the high penetration notification (HPN) subscriber feature is additionally provided within the second PLMN 10B, subscriber data needed for effectuating the HPN subscriber feature are retrieved from the register (R3) 260 by the application module 270. The retrieved HPN subscriber data are then combined with the subscriber data received from the HLR 50. The combined subscriber data are then communicated to the serving MSC/VLR 40 via yet another Insert Subscriber Data MAP based signal 330. The serving MSC/VLR 40, not knowing that the additional subscriber data unique to the second PLMN 10B have been added by the PE 250, stores the received data within an associated register. Subscriber feature application modules (not shown in FIGS. 3 and 4) then utilize the stored subscriber data to provide available subscriber features, including the HPN subscriber feature, to the roaming mobile station 30 even though the mobile station 30 itself never provided the necessary subscriber data for the HPN subscriber feature.

Such additional subscriber data stored at the register (R3) 260 and utilized by the application module 270 within the PE 250 may be defined by service operators while making a roaming agreement between the first PLMN 10A and the second PLMN 10B. As a result, all mobile stations associated with the first PLMN 10A and roaming into the second PLMN 10B may be provided with operator defined features and services without independently being subscribed to by each mobile subscriber.

Still referring to both FIGS. 3 and 4, the routing of an incoming call connection in accordance with the teachings of the present invention is illustrated. An incoming call connection request, such as an Initial Address Message (IAM) 75, towards the mobile station 30 is received by a gateway mobile switching center (GMSC) associated with the first PLMN 10A. As fully described in FIG. 1, a dialed MSISDN number representing the mobile station 30 enables the transmitted IAM signal to be routed to the home PLMN associated with the roaming mobile station. Not knowing which MSC/VLR is currently serving the called party mobile station 30, the GMSC 80 transmits a MAP based signal 90 requesting routing instructions (routing information) to the associated HLR 50. The HLR 50 then transmits yet another MAP based signal 110 in an attempt to ascertain a roaming number representing the serving MSC/VLR 40. In accordance with the teachings of the present invention, a network address representing the serving MSC/VLR stored within the HLR 50 actually represents the PE 250. The HLR transmitted MAP based signal 110 is therefore routed to the PE 250 associated with the second PLMN 10B. The PE 250 then identifies the MSC/VLR 40 currently serving the mobile station and, in turn, forwards the signal 300 thereto. The MSC/VLR 40 then returns the roaming number back to the PE 250 via a return signal 310. The PE 250 again identifies the HLR 50 associated with the incoming call connection and forwards the received roaming number to the identified HLR 50 via another signal 120. The HLR 50 then provides the received roaming number identifying the serving MSC/VLR 40 to the requesting GMSC 80 via a signal 150. As a result, using the received roaming number as the called party address, the GMSC 80 effectuates a circuit connection 130 with the serving MSC/VLR 40. The MSC/VLR 40 then pages the mobile station 30 and establishes an air-interface with the roaming mobile station 30.

As illustrated, for a mobile station roaming within a visited PLMN, all signals communicated between the HLR 50 and the serving MSC/VLR 40 are transparently interfaced via the PE 250. Such communications are transparent since the HLR and the MSC/VLR are not aware of the fact that a separate service node, such as a PE, is interfaced therebetween.

Figure 5:
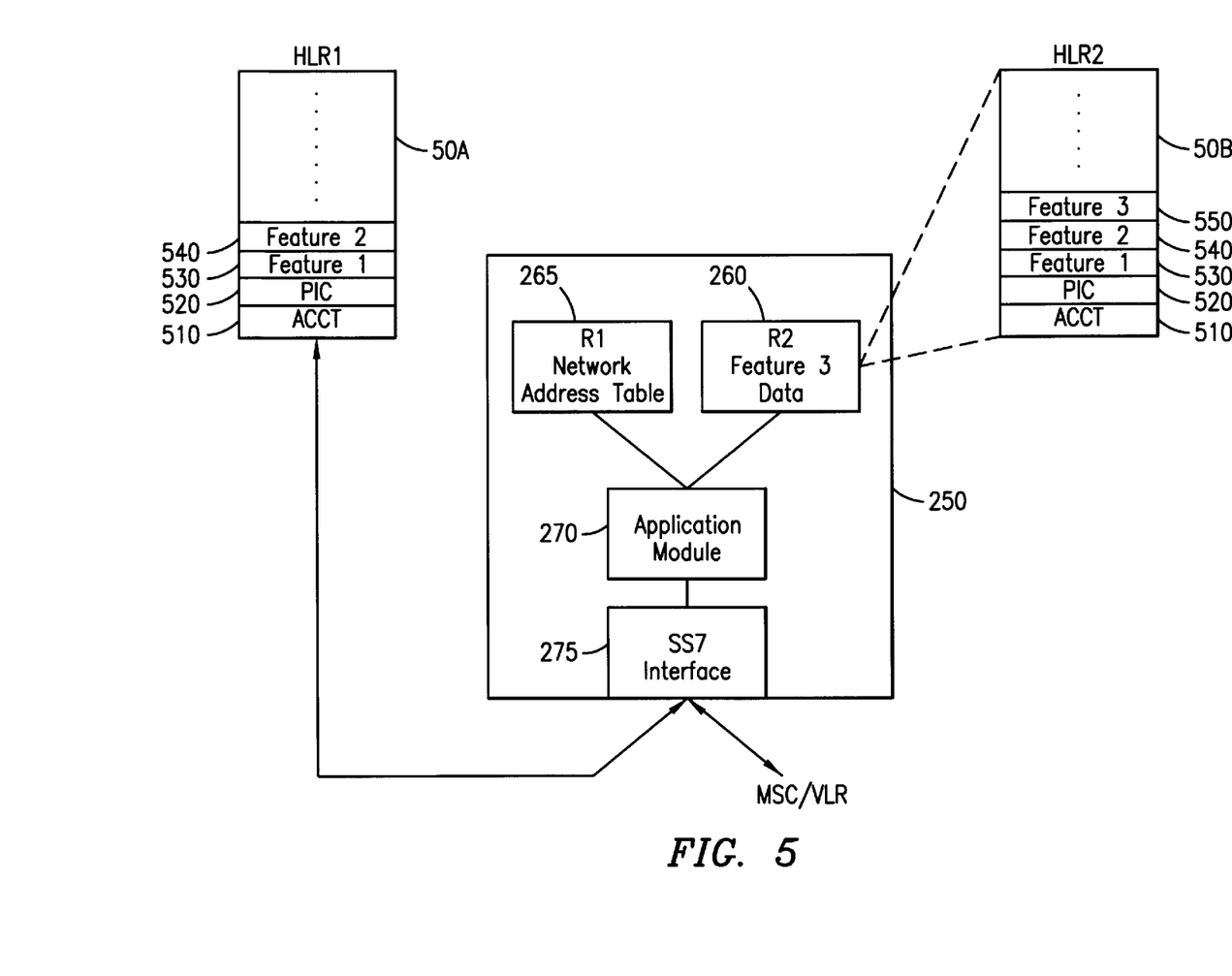
FIG. 5 is a block diagram of a protocol enhancer (PE) illustrating the interworking of subscriber data for providing additional subscriber features to the roaming mobile subscriber.

FIG. 5 is a block diagram of a protocol enhancer (PE) interfaced between an HLR and an MSC/VLR. A first home location register (HLR1) 50A associated with a first PLMN, for example, stores data 510 reflecting the accounting or billing information associated with a particular mobile station or subscriber. The first HLR 50A further stores preferred inter-LATA carrier information 520 associated with the associated mobile subscriber. Subscriber feature data 530–540 are further stored at the first HLR1 50A. Such subscriber feature data, for example, indicate which forward to number 530 is to be used for a call forwarding on busy (CFB) feature, and which barring categories 540 are currently placed on the associated mobile subscriber. Such subscriber data are then communicated to a serving MSC/VLR to effectuate mobile service in a uniform manner throughout the first PLMN.

A second home location register (HLR2) 50B similarly stores subscriber data for its own mobile subscribers. However, because the second PLMN might provide additional subscriber features than the first PLMN, the second HLR 50B may store additional subscriber data 550 representing a subscriber feature not available or supported by the first PLMN.

Accordingly, in accordance with the teachings of the present invention, the subscriber data 550 pertaining to the additional subscriber feature are stored within a register (R2) associated with the PE 250. Whenever the PE 250 receives a location update from an MSC/VLR located within the second PLMN yet serving a mobile station associated with the first PLMN, an application module 270 receives the transmitted signal over a connected Signaling System No. 7 (SS7) based interface module 275. The application module 270 identifies the home location register (HLR1) 50A associated with the indicated IMSI number and stores data correlating the identified HLR1 50A with the serving MSC/VLR at a register (R1) 265. The application module 270 then performs the location update with the HLR1 50A.

The application module 270 receives the subscriber data 510–540 associated the roaming mobile station from the HLR1 50A. The application module 270 then retrieves the stored subscriber data 550 representing the subscriber feature additionally provided within the visited PLMN from the register (R2) 260. Using the previously stored data correlating the HLR1 50A with serving MSC/VLR, the application module thereafter communicates both data to the serving MSC/VLR. The serving MSC/VLR then utilizes the received combined subscriber data to provide otherwise undefined or not subscribed subscriber feature to the roaming mobile station.

In accordance with another embodiment of the present invention, the application module 270 may add different groups or types of subscriber data per different series of IMSI numbers. As an illustration, for MCC+MNC+1000 to MCC+MNC+2000 series, the PE 250 provides additional subscriber data representing the basic subscriber features to associated roaming mobile stations. For MCC+MNC+3000 to MCC+MNC+4000 series, the PE 250 instead provides subscriber data representing special or extra subscriber features to associated roaming mobile stations. Accordingly, depending on the received IMSI numbers, the application module 270 may provide different grades of subscriber features or services to roaming mobile stations.

As another embodiment of the present invention, one of the subscriber data transmitted by the HLR1 50A, for example, may further include data categorizing the associated mobile subscriber. Utilizing such category data, the application module 270 associated with the PE 250 may provide an appropriate grade or level of subscriber features to the roaming mobile subscriber.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for providing a subscriber feature to a roaming mobile station, said mobile station having a subscription agreement with a first mobile telecommunications network and currently roaming within a second mobile telecommunications network, said method comprising the steps of:

receiving an indication from said mobile station to register with a particular mobile telecommunications node within said second telecommunications network;

retrieving first subscription data from said first mobile telecommunications network associated with said mobile station;

combining said retrieved first subscription data with second subscription data associated with said second mobile telecommunications network wherein said second subscription data comprises subscription data representing subscriber features being provided within said second mobile telecommunications network and not being provided within said first mobile telecommunications network; and providing subscriber features toward said roaming mobile station utilizing said combined first and second subscription data within said second mobile telecommunications network.

2. The method of claim 1 wherein said step of receiving said indication comprises the step of receiving a registration message from said mobile station, said registration message including an identification number representing said mobile station and associated with said first mobile telecommunications network.

3. The method of claim 2 wherein said step of retrieving said first subscription data comprises the steps of:

transmitting a location update signal from said mobile telecommunications node to a centralized database associated with said second mobile telecommunications network;

forwarding said received location update signal from said centralized database to a home location register associated with said mobile station and located within said first mobile telecommunications network; and receiving said first subscription data at said centralized database from said HLR.

4. The method of claim 3 wherein said step of combining said retrieved first subscription data further comprises the steps of:

retrieving at said centralized database said second subscription data;

combining said retrieved second subscription data with said received first subscription data; and communicating said combined subscription data from said centralized database to said mobile telecommunications node serving said roaming mobile station.

5. The method of claim 1 wherein said mobile telecommunications node comprises a mobile switching center/visitor location register (MSC/VLR) serving said roaming mobile station currently traveling within said second mobile telecommunications network.

6. A first mobile telecommunications network for providing subscriber features to a roaming mobile station, said mobile station associated with a second mobile telecommunications network and assigned with a mobile identification number representing a home location register (HLR) located within said second mobile telecommunications network, said first mobile telecommunications network comprising:

a mobile switching center (MSC) for providing mobile service for said mobile station traveling within said first mobile telecommunications network and not being provided within second mobile telecommunications network;

a telecommunications service node connected to said MSC comprising:

a register for storing first subscription data representing subscriber features being provided within said first mobile telecommunications network;

an application module for retrieving second subscription data associated with said mobile station from said HLR, said application module further combining said retrieved second subscription data with said first subscription data; and an interface module for communicating said combined first and second subscription data to said MSC; and an application module associated with said MSC for correlating said identification number associated with said mobile station with said telecommunications service node.

7. The first mobile telecommunications network of claim 6 wherein said application module associated with said MSC comprises means for forwarding signals intended for said HLR associated with said mobile station instead to said telecommunications service node.

8. The first mobile telecommunications network of claim 6 wherein said telecommunications service node further comprises a second register for storing data correlating said HLR associated with said mobile station with said MSC currently serving said mobile station.

9. A telecommunications service node for providing subscriber data to a mobile switching center (MSC) currently serving a particular mobile station, said mobile station associated with a first mobile telecommunications network and currently roaming within a second mobile telecommunications network, said first mobile telecommunications network associated with a home location register (HLR) for storing first subscription data associated with said mobile station, comprising:

a first register for storing second subscription data associated with subscriber features being provided within said second mobile telecommunications network, wherein said second subscription data comprises subscription data representing subscriber features being provided within said second mobile telecommunications network and not being provided within said first mobile telecommunications network;

an interface module for receiving a signal from said MSC requesting subscriber data for said mobile station;

an application module for retrieving said first subscription data from said HLR over said interface module and combining said retrieved first subscription data with said stored second subscription data; and wherein said interface module communicates said combined first and second subscription data to said MSC.

10. The telecommunications service node of claim 9 further comprising a second register for storing data correlating said HLR with said MSC currently serving said mobile station.

11. The telecommunications service node of claim 9 wherein said interface module communicates Signaling System No. 7 (SS7) based signals with said MSC and said HLR.

12. The telecommunications service node of claim 11 wherein said SS7 based signals comprise a Mobile Application Part (MAP) based signals.

13. The telecommunications service node of claim 11 wherein said signal received from said MSC comprises a location update MAP signal.

14. The telecommunications service node of claim 11 wherein said interface module communicates said combined first and second subscription data to said MSC using a MAP based insert subscriber data signal.

15. A method for providing subscriber data to a mobile telecommunications node serving a particular mobile station, said mobile telecommunications node associated with a first mobile telecommunications network and said mobile station associated with a second mobile telecommunications network, said method comprising the steps of:

storing first subscription data representing a subscriber feature provided within said first mobile telecommunications network;

receiving a first signal at a service node associated with said first mobile telecommunications network from said mobile telecommunications node, said signal requesting subscriber data associated with said mobile station;

transmitting a second signal from said service node to a home location register (HLR) associated with said mobile station and located within said second mobile telecommunications network, said second signal requesting second subscription data associated with said mobile station;

receiving a third signal from said HLR including said second subscription data, said second subscription data not including data representing said subscriber feature provided within said first mobile telecommunications network;

retrieving said stored first subscriber data representing said subscriber feature; and transmitting a fourth signal from said service node to said mobile telecommunications node, said fourth signal including said first and second subscriber data.

16. The method of claim 15 wherein said first signal comprises a location update signal.

17. The method of claim 15 wherein said fourth signal comprises an insert subscriber data signal.

18. The method of claim 15 further comprising the steps of:

receiving a fifth signal from said HLR requesting a routing instruction; and forwarding said received fifth signal from said service node to said MSC currently serving said mobile telecommunications node.

19. The method of claim 15 wherein said mobile telecommunications node comprises a mobile switching center/visitor location register (MSC/VLR) serving a particular geographic area.

* * * * *